United States Patent
Nozawa et al.

(10) Patent No.: US 6,348,926 B1
(45) Date of Patent: Feb. 19, 2002

(54) IMAGE CONVERSION METHOD AND CONVERSION DEVICE

(75) Inventors: Kazushi Nozawa, Okayama; Tsutomu Muraji, Nara; Satoshi Hirotsune, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/367,633

(22) PCT Filed: Jan. 18, 1999

(86) PCT No.: PCT/JP99/00143

§ 371 Date: Dec. 1, 1999

§ 102(e) Date: Dec. 1, 1999

(87) PCT Pub. No.: WO00/38119

PCT Pub. Date: Jul. 29, 1999

(30) Foreign Application Priority Data

Jan. 22, 1998 (JP) ............................................. 10-10067

(51) Int. Cl.[7] .......................... H04N 7/01; G06K 9/32; G09G 5/04
(52) U.S. Cl. .................. 345/603; 345/547; 348/581; 348/448; 348/715; 382/260; 382/265; 382/276
(58) Field of Search ............................ 348/551, 441, 348/448, 445, 715–716, 578, 571, 700–702, 711, 714, 666, 490, 497, 451; 345/127, 132, 149, 154, 193, 515, 516, 517, 508, 511, 203, 603–604, 598, 618, 475, 536, 547; 382/276, 282, 300, 194, 260–265

(56) References Cited

U.S. PATENT DOCUMENTS

| 4,631,750 A | 12/1986 | Gabriel et al. ................. 382/41 |
| 4,853,794 A | * 8/1989 | Fukumoto .................... 358/447 |
| 4,908,874 A | * 3/1990 | Gabriel ........................ 382/41 |
| 5,748,250 A | * 5/1998 | Markandley ................. 348/451 |
| 5,761,341 A | * 6/1998 | Go .............................. 382/232 |

FOREIGN PATENT DOCUMENTS

| EP | 735674 | * 2/1996 | ........... H03H/21/00 |
| JP | 2131282 | 5/1990 | |
| JP | 403113911 | * 5/1991 | ........... H03H/17/02 |
| JP | 622285 | 1/1994 | |
| JP | 6350915 | 12/1994 | |
| JP | 409069756 | * 3/1997 | ........... H03H/17/06 |
| JP | 10333669 | 12/1998 | |
| JP | 11213145 | * 8/1999 | ............. G06T/3/40 |
| WO | 099/38119 | * 7/1999 | ............. G06T/3/40 |
| WO | 01/04836 | * 1/2001 | ............. G06T/3/40 |

* cited by examiner

Primary Examiner—Jeffery Brier
Assistant Examiner—Wesner Sajous
(74) Attorney, Agent, or Firm—Stevens, Davis, Miller & Mosher, LLP (57) ABSTRACT

To realize image conversion processing by means of filtering using a multi-tap structure without requiring that a memory to use has a high-speed capability, a merge circuit 102 merges sampled input image signals for every plurality pieces of continuous pixel data and outputs signals, and a memory element 103 stores approximately one frame of output data from the merge circuit 102. The memory element 103 outputs signals to a memory element 104 in accordance with outputs from a memory element 107 which stores control data which are calculated in advance. The memory element 104 stores a larger number of input signals received from the memory element 103 than the number of taps of a filtering circuit 106, and outputs signals to a selection circuit 105. The selection circuit 105 selects signals required by the filtering circuit 106 from input signals received from the memory element 104 and outputs signals to the filtering circuit 106. The filtering circuit 106 generates output image signals, using input signals received from the selection circuit 105.

12 Claims, 6 Drawing Sheets

IMAGE CONVERSION METHOD AND CONVERSION DEVICE

BACKGROUND OF THE INVENTION

1. Field of the Invention

The present invention relates to an image conversion method and an image conversion apparatus for allowing a matrix type fix display device, such as a liquid crystal display, to display image signals of various types of systems.

2. Description of the Background Art

Among methods which are used to display image signals of various types of systems in a matrix type fix display device are, as introduced in "Image Analysis Handbook (University of Tokyo Press)," nearest neighbor interpolation, bi-linear interpolation, cubic convolution interpolation and the like. Means for embodying such methods may be a method externally using a memory which can be accessed at random as described in U.S. Pat. No. 4,631,450, for example.

Figure 6:
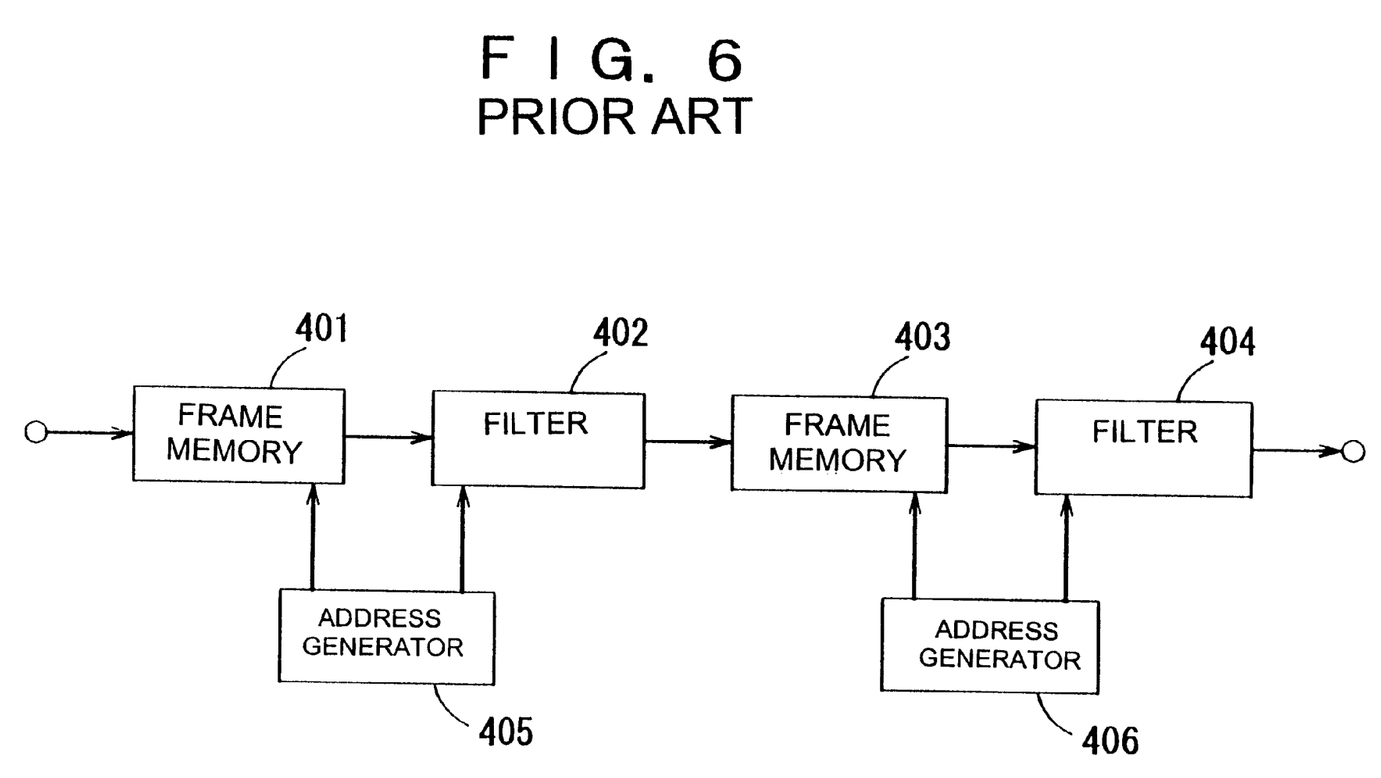
FIG. 6 is a block diagram of a structure of an image conversion apparatus which executes conventional image conversion processing.

FIG. 6 is a block diagram of a conventional image conversion apparatus. In FIG. 6, frame memories 401, 403 are accessible at random and have a function of converting horizontal scanning and vertical scanning of one frame of sampled image signals and outputting the signals. A vertical conversion filter 402 executes processing for expanding or reducing an image in the vertical direction. A horizontal conversion filter 404 executes processing for expanding or reducing an image in the horizontal direction. An address generator 405 generates horizontal addresses and vertical addresses which are to be supplied to the frame memory 401 as well as to the vertical conversion filter 402. An address generator 406 generates horizontal addresses and vertical addresses which are to be supplied to the frame memory 403 as well as to the horizontal conversion filter 404.

Next, operations of the image conversion apparatus will be described. In the image conversion apparatus, first, input image signals are written in the frame memory 401 in the order of horizontal scanning of the input signals, in accordance with outputs from the address generator 405, namely, write addresses. The frame memory 401 reads in the order of vertical scanning, in accordance with outputs from the address generator 405, namely, read addresses, for the purpose of conversion of horizontal scanning into vertical scanning.

The signals thus read out are supplied to the vertical conversion filter 402 which thereafter expands or reduces the signals in the vertical direction. At this stage, as the address generator 405 supplies addresses to the vertical conversion filter 402, depending on the contents of these addresses, read addresses in the frame memory 401 may be changed to thereby accordingly control (change) a filtering characteristic of the vertical conversion filter 402. That is, as the addresses are supplied, it is possible to change the filtering characteristic (filtering contents) in accordance with vertical positions.

Next, outputs from the vertical conversion filter 402 are written in the frame memory 403 in the order of the outputs in accordance with outputs from the address generator 406, namely, write addresses. For conversion of vertical scanning into horizontal scanning, the frame memory 403 reads in the order of horizontal scanning in accordance with outputs from the address generator 406, namely, read addresses.

Image signals outputted from the frame memory 403 are in the horizontal and vertical scanning condition of the input image signals which were supplied to the frame memory 401.

The signals read from the frame memory 403 are thereafter supplied to the horizontal conversion filter 404 which then expands or reduces the images in the horizontal direction. At this stage, as the address generator 406 supplies addresses to the horizontal conversion filter 404, depending on the contents of these addresses, read addresses in the frame memory 403 may be changed to thereby accordingly control (change) a filtering characteristic of the horizontal conversion filter 404. That is, as the addresses are supplied, it is possible to change the filtering characteristic (filtering contents) in accordance with horizontal positions.

However, in a structure according to the conventional technique as described above, where one wishes to use filtering means of a multi-tap structure for handling a large quantity of pixel data which are needed for processing, it is necessary to execute a memory access for reading the pixel data from a frame memory at a speed which is defined as a cycle speed of the pixel data multiplied by the number of the taps of the filtering means.

As herein termed, filtering refers to interpolation in pixel conversion processing. However, in a broad sense, filtering also means bandwidth restriction processing, aperture processing, etc.

For example, where input image signals is XGA signals (1,024 dots in the horizontal direction×768 dots in the vertical direction) of 60 Hz and 4-tap filtering means is to be used, since a cycle speed of pixel data is 65 MHz, it is necessary to read out pixel data while accessing a frame memory at 260 MHz.

Accessing a memory at such a high speed is very difficult considering the specifications of currently available memories, and hence, can not be realized without a difficulty.

SUMMARY OF THE INVENTION

The present invention aims at providing an image conversion method, an image conversion apparatus and a liquid crystal projector for realizing image conversion utilizing filtering processing with a multi-tap structure without requiring a memory to use a high-speed capability.

A first aspect of the present invention is directed to an image conversion method in which output image signals are generated through filtering processing which uses a plurality pieces of continuous pixel data of input image signals which are sampled, wherein pixel data of approximately one frame of said input image signals are stored in first memory means, a larger quantity of continuous pixel data containing a plurality pieces of continuous pixel data needed for said filtering processing are read in advance from said first memory means and stored in second memory means, the plurality pieces of continuous pixel data needed for said filtering processing are selected from said second memory means, and said output image signals are generated through said filtering processing which uses the selected plurality pieces of pixel data.

According to the method described above, it is possible to output a plurality pieces of continuous pixel data from the first memory means for one access and select necessary pixel data from the second memory means, and therefore, it is possible to realize image conversion which does not require high-speed memory accessing.

A third aspect of the present invention is directed to an image conversion apparatus which generates output image signals through filtering processing which uses a plurality pieces of continuous pixel data of input image signals which are sampled, comprising: filtering means which generates said output image signals from said plurality pieces of continuous pixel data; merging means which receives said input image signals, and merges and outputs said input image signals for every plurality pieces of continuous pixel data; first memory means which receives an output from said merging means and stores pixel data of approximately one frame; second memory means which receives an output from said first memory means, and stores and outputs a larger quantity of continuous pixel data than a plurality pieces of continuous pixel data required by said filtering means; selecting means which receives an output from said second memory means, and selects and outputs the plurality pieces of continuous pixel data required by said filtering means; and third memory means which stores and outputs address data which are calculated in advance to control an output from said first memory means and control data which are calculated in advance to control a filter factor of said filtering means, wherein said filtering means receives an output from said selecting means, and in accordance with the address data in said third memory means, said first memory outputs a larger quantity of pixel data than the pixel data which are required by said filtering means.

The structure above allows to output a plurality pieces of continuous pixel data from the first memory means for one access and select necessary pixel data from the second memory means and the selecting means, and therefore, it is possible to realize image conversion utilizing filtering with a multi-tap structure which does not require high-speed memory accessing and ensure that image conversion processing produces a high image quality. Further, as the third memory means stores data which are calculated in advance based on desired magnifications for reduction conversion and expansion magnification, it is possible to convert at various magnifications.

An eighth aspect of the present invention is directed to an image conversion apparatus which generates output image signals through filtering processing which uses a plurality pieces of continuous pixel data of input image signals which are sampled, comprising: filtering means which generates output image signals from said plurality pieces of continuous pixel data; merging means which receives said input image signals, and merges and outputs said input image signals for every plurality pieces of continuous pixel data; first, second and third memory means which receive an output from said merging means and store pixel data of approximately one frame; first selecting means which receives outputs from said first, said second and said third memory means, and selects and outputs any one of the outputs from said first, said second and said third memory means; fourth memory means which receives an output from said first selecting means, and stores and outputs a larger quantity of continuous pixel data than a plurality pieces of continuous pixel data required by said filtering means; second selecting means which receives an output from said fourth memory means, and selects and outputs the plurality pieces of continuous pixel data required by said filtering means; and fifth memory means which stores and outputs address data which are calculated in advance to control the outputs from said first, said second and said third memory means and control data which are calculated in advance to control a filter factor of said filtering means, wherein said first, said second and said third memory means repeatedly write pixel data of different sequential frames of said input signals, said first selecting means selects any one of said first, said second and said third memory means which completed writing, said filtering means receives the output from said second selecting means, and in accordance with the address data in said fifth memory means, said first, said second and said third memory means output a larger quantity of pixel data than the pixel data which are required by said filtering means.

The structure above allows to output a plurality pieces of continues pixel data from the first, the second and the third memory means for one access. Further, the first, the second and the third memory means store pixel data of continuos three frames of continuous input image signals. A speed for writing pixel data to the first, the second and the third memory means and a speed for reading pixel data from the first, the second and the third memory means can be different from each other. The fourth memory means and the second selecting means can select necessary pixel data. Hence, it is possible to realize conversion of a frame frequency and image conversion utilizing filtering with a multi-tap structure which does not require high-speed memory accessing and ensure that image conversion produces a high image quality. In addition, use of the first, the second and the third memory means allows that the memory means for storing outputs from the merging means is different from the memory means for outputting to the first selecting means, it is possible to eliminate conflict between storing and outputting within the same memory means, and hence, to simplify control of the memory means. Further, as the fifth memory means store data which are calculated in advance based on desired magnifications for reduction conversion and expansion magnification, it is possible to convert at various magnifications.

A thirteenth aspect of the present invention is directed to a liquid crystal projector which generates output image signals through filtering processing which uses a plurality pieces of continues pixel data of input image signals which are sampled, comprising: filtering means which generates output image signals from said plurality pieces of continuos pixel data; merging means which receives said input image signals, and merges and outputs said input image signals for every plurality pieces of continues pixel data; first, second and third memory means which receive an output from said merging means and store pixel data of approximately one frame; first selecting means which receives outputs from said first, said second and said third memory means, and selects and outputs any one of the outputs from said first, said second and said third memory means; fourth memory means which receives an output from said first selecting means, and stores and outputs a larger quantity of continuous pixel data than a plurality pieces of continuous pixel data required by said filtering means; second selecting means which receives an output from said fourth memory means, and selects and outputs the plurality pieces of continuous pixel data required by said filtering means; fifth memory means which stores and outputs address data which are calculated in advance to control the outputs from said first, said second and said third memory means and control data which are calculated in advance to control a filter factor of said filtering means; driving means which receives an output from said filtering means and executes processing for displaying; a liquid crystal panel which receives an output from said driving means and modulates light in accordance with an input to said liquid crystal panel; a lamp; lighting means which turns on said lamp; converging means which converges light emitted from said lamp and irradiates the light upon said liquid crystal panel; and projecting means which projects light passing through said liquid crystal panel of illumination from said projecting means, wherein said first, said second and said third memory means repeatedly write pixel data of different sequential frames of said input signals, said first selecting means selects any one of said first, said second and said third memory means which completed writing, said filtering means receives the output from said second selecting means, and in accordance with the address data in said fifth memory means, said first, said second and said third memory means output a larger quantity of pixel data than the pixel data which are required by said filtering means.

The structure above allows to output a plurality pieces of continues pixel data from the first, the second and the third memory means for one access. Further, the first, the second and the third memory means store pixel data of continuos three frames of continuous input image signals. A speed for writing pixel data to the first, the second and the third memory means and a speed for reading pixel data from the first, the second and the third memory means can be different from each other. The fourth memory means and the second selecting means can select necessary pixel data. Hence, it is possible to realize a liquid crystal projector having a high image quality which performs conversion of a frame frequency and image conversion utilizing filtering with a multi-tap structure which does not require high-speed memory accessing. In addition, use of the first, the second and the third memory means allows that the memory means for storing outputs from the merging means is different from the memory means for outputting to the first selecting means, it is possible to eliminate conflict between storing and outputting within the same memory means, and hence, to simplify control of the memory means. Further, as the fifth memory means store data which are calculated in advance based on desired magnifications for reduction conversion and expansion magnification, it is possible to convert at various magnifications.

BRIEF DESCRIPTION OF THE DRAWINGS

FIGS. 2(a) through 2(j) are explanatory diagrams for describing operations of image conversion;

FIGS. 4(a) through 4(d) are explanatory diagrams for describing operations of image conversion;

DESCRIPTION OF THE PREFERRED EMBODIMENTS

In the following, an image conversion method, and image conversion apparatuses and a liquid crystal projector according to preferred embodiments of the present invention will be described with reference to the associated drawings.

[First Preferred Embodiment]

Figure 1:
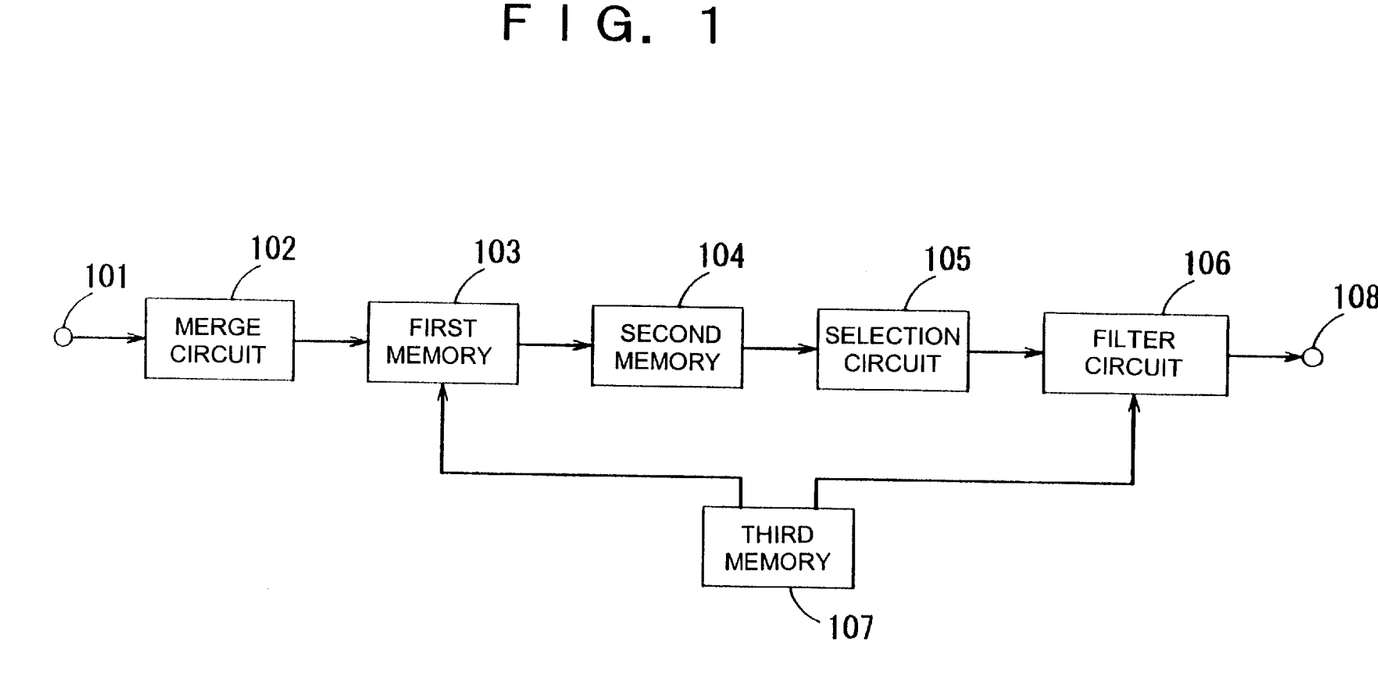
FIG. 1 is a block diagram of a structure of an image conversion apparatus according to a first preferred embodiment of the present invention.

FIG. 1 is a block diagram of a structure of an image conversion apparatus according to a first preferred embodiment of the present invention. In FIG. 1, input image signals are supplied to an input terminal 101. A filtering circuit 106 has a function as filtering means which generates output image signals from a plurality pieces of continuos pixel data.

A merge circuit 102 has a function as merging means which merges and outputs the input image signals supplied to the input terminal 101 for every plurality pieces of continues pixels. A first memory element 103 has a function as first memory means which stores approximately one frame of outputs from the merge circuit 102. A second memory element 104 has a function as second memory means which, from outputs from the first memory element 103, stores and outputs a larger quantity of continuos pixel data than pixel data which are required by the filtering circuit 106. A selection circuit 105 has a function as selecting means which selects pixel data required by the filtering circuit 106 from outputs received from the second memory element 104 and outputs pixel data to the filtering means 106. A third memory element 107 has a function as second memory means which stores and outputs address data which are calculated in advance to control outputs from the first memory element 103 and control data which are calculated in advance to control a filter factor of the filtering circuit 106. At an output terminal 108, image conversion outputs from the filtering circuit 106 are available.

In the structure above, the filtering circuit 106 receives outputs from the selection circuit 105, and the first memory element 103 outputs a larger quantity of pixel data than pixel data which are required by the filtering circuit 106, in accordance with the address data within the third memory element 107.

Now, a description will be given on operations of image conversion for reduction down to 1/3 in the horizontal direction in the structure according to the first preferred embodiment as described above, while referring to FIGS. 2(a)–2(j). However, the filtering circuit 106, the merge circuit 102, the first and the second memory elements 103 and 104 have the following structures, for the purpose of such image conversion.

That is, the filtering circuit 106 is a 4-tap filtering circuit which generates output image signals using four pieces of continious pixel data. The 4-tap filtering circuit is a circuit for obtaining one output signal from four input signals, and as such, adds up multipication results obtained by multiplying the input data by values (factors) which can be set separately to four input signals, to thereby generate one output signal.

Meanwhile, the merge circuit 102 is a circuit which merges every four pieces of continuous pixel data with each other and outputs data. Four memory elements each shifting for every pixel are arranged in series such that the merge circuit 102 merges (parallel conversion) outputs received from the four memory elements in a cycle of four pixels. For instance, when one pixel is 8-bit data, merged data are 32-bit data.

The first memory element 103 is a frame memory which can be accessed at random. The second memory element 104 is a register which stores and outputs eight pieces of pixel data.

Figure 2:
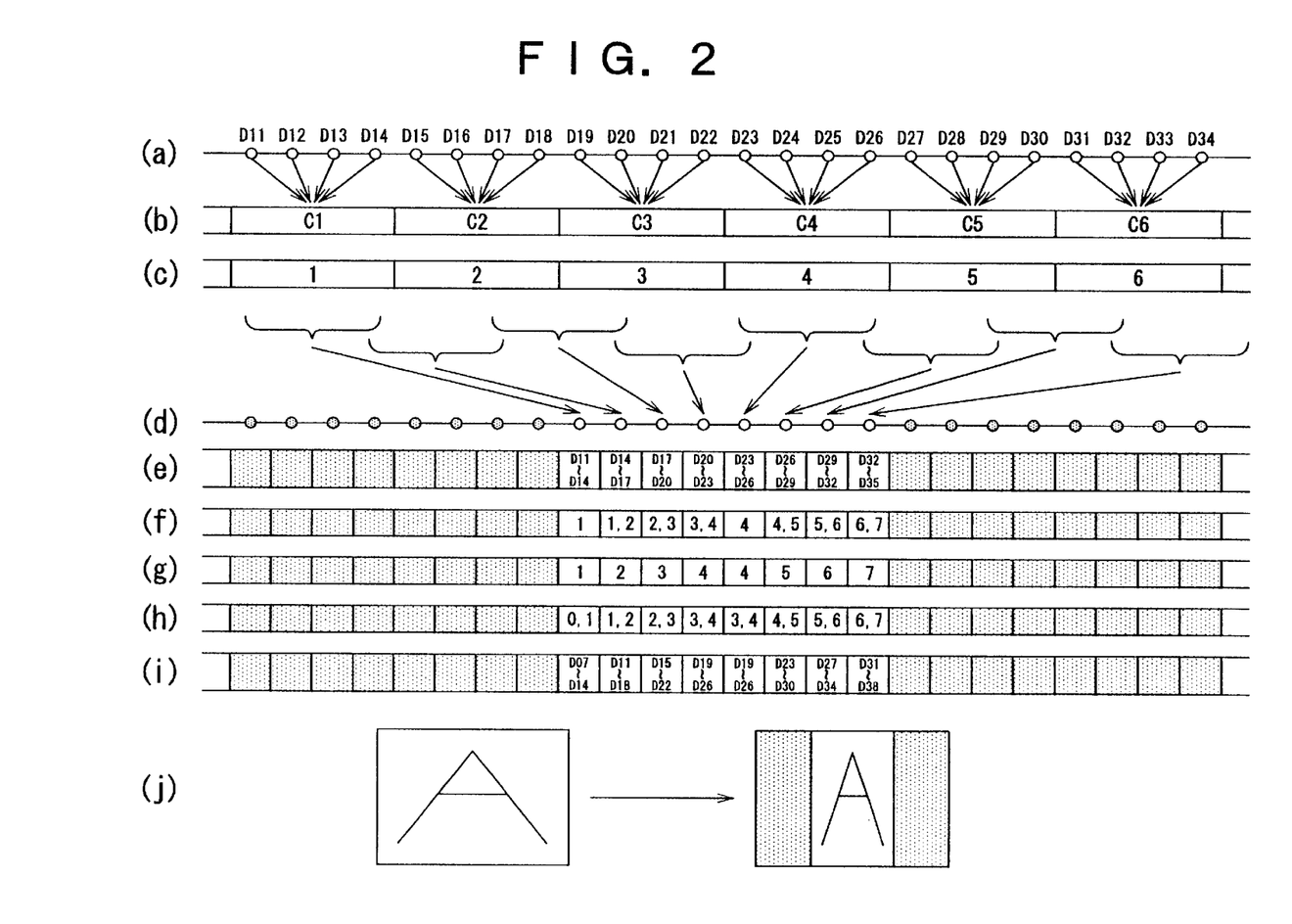

Input image signals, as denoted in FIG. 2(a) as "INPUT IMAGE SIGNALS," are cyclically supplied one after another at the input terminal 101 to the merge circuit 102 (pixel data D11 to D34). The merge circuit 102, as denoted in FIG. 2(b) as "OUTPUTS FROM MERGE CIRCUIT," merges inputs thereto for every four pieces of continuous pixel data D11 to D14, D15 to D18, D19 to D22, D23 to D26, D27 to D30, and D31 to D34 and outputs signals (merge signals C1 to C6). In this case, when the input image signals received at the input terminal 101 are signals having a width of eight bits, the merge signals C1 to C6 outputted from the merge circuit 102 are signals having a width of 32 bits.

The first memory element 103, as denoted in FIG. 2(c) as "MEMORY ADDRESSES," stores the merge signals C1 to C6, i.e., the outputs from the merge circuit 102, at addresses 1 to 6 which increment 1 every time the merge circuit 102 executes the merge operation.

For image conversion at a magnification of 1/3, as denoted in FIG. 2(e) as "CONTENTS OF SIGNALS REQUIRED FOR FILTERING," pixel data which are needed by the filtering circuit 106 are four pieces of pixel data which are continuous every three pixels. Further, the four pieces of pixel data, as denoted in FIG. 2(f) as "MEMORY ADDRESSES AT WHICH SIGNALS REQUIRED FOR FILTERING EXIST," are always stored at one memory address or two continuous memory addresses. In FIG. 2(d), ranges of signals required for filtering are shown in grouping symbols correlated to the pixel data of "INPUT IMAGE SIGNALS" in FIG. 2(a), for every pixel of "CONVERSION IMAGE SIGNALS."

Hence, the third memory element 107, as denoted in FIG. 2(g) as "MEMORY ADDRESSES OF SIGNALS TO OUTPUT," preliminarily calculates one of memory addresses containing the four pieces of continuous pixel data required by the filtering circuit 106, namely, the address bearing the larger figure in this example, for every pixel of "CONVERSION IMAGE SIGNALS" in FIG. 2(d) and stores the address.

In accordance with data of the address mentioned above stored and outputted by the third memory element 107, the first memory element 103 outputs signals which contain pixel data required by the filtering circuit 106 to the second memory element 104. In this case, the third memory element 107 outputs the data at the timing which is the same as a distance between the pixels of "CONVERSION IMAGE SIGNALS" in FIG. 2(d). In short, the contents of the address changes for every piece of the pixel data of the image signals to be converted and outputted.

Since the second memory element 104 is a circuit which stores and outputs pixel data which are twice larger than pixel data which are merged by the merge circuit 102, the second memory element 104 stores and outputs two signals merged by the merge circuit 102 which are the outputs from the first memory element 103.

The two signals described here are signals which are outputted at two different addresses in the first memory element 103 which are updated every time the address data in the first memory element 103 received from the third memory element 107 change, as denoted in FIG. 2(h) as "MEMORY ADDRESSES OF SIGNALS SUPPLIED TO SELECTION CIRCUIT," for example.

More precisely, the second memory element 104 stores two different addresses which are updated as described above. That is, the second memory element 104 is formed by a 2-stage first-in-first-out memory, for instance, which is capable of storing data which are equivalent to two addresses, and stores updated data while discarding data developed through an old memory operation every time data of an address outputted from the third memory element 107 change.

Hence, outputs from the second memory element 104 include all of pixel data required by the filtering circuit 106 as denoted in FIG. 2(i) as "CONTENTS OF SIGNALS SUPPLIED TO SELECTION CIRCUIT."

The selection circuit 105 selects pixel data required by the filtering circuit 106 from the outputs the second memory element 104 supplies to the selection circuit 105 based on the signals received from the third memory element 107, and outputs the pixel data to the filtering circuit 106.

Since the third memory element 107 calculates and stores in advance the control data which control the filter factor of the filtering circuit 106 for image conversion at a magnification of 1/3, the filtering circuit 106 generates image conversion signals from the output signals received from the selection circuit 105 and outputs the image conversion signals at the output terminal 108, in accordance with the control data which are outputted from the third memory element 107. FIG. 2(j) shows that an input image (left-hand side) is reduced down to 1/3 in the horizontal direction and consequently becomes a convered image (right-hand side).

The control data which control the filter factor described above are multipliers (factors) which are uniquely determined relative to four signals in accordance with to which signals having which phases (i.e., information regarding at which positions between which data and which data) the four signals should be converted and depending on with which conversion characteristic conversion should be executed. The filtering circuit 106 outputs a sum of the four signals multiplied by the multipliers.

Through these operations, an image conversion method is realized in which approximately one frame of pixel data of input image signals are stored in the first memory element 103, a larger quantity of continuous pixel data containing a plurailty of continuous pixel data which are required for filtering are read from the first memory element 103 in advance and stored in the second memory element 104, the plurailty of continuous pixel data which are required for filtering are selected from the second memory element 104, and output image signals are generated through filtering utilizing the plurailty of selected continuous pixel data.

As described above, according to the first preferred embodiment of the present invention, outputs from the merge circuit 102 are stored in the first memory element 103, outputs from the first memory element 103 are stored in the second memory element 104 which is capable of storing two signals merged by the merge circuit 102, outputs from the second memory element 104 are selected by the selection circuit 105, and the selected outputs are supplied to the filtering circuit 106 for image conversion. Hence, the first memory element 103 can output a plurailty of continuous pixel data for one access and the second memory element 104 and the selection circuit 105 can select necessary pixel data, and therefore, it is possible for the filtering circuit 106, which has a multi-tap structure and does not require high-speed accessing of the memory elements, to perform image conversion. In this case, the more taps there are disposed, the better the conversion characteristic is.

In addition, since the control data are uniquelly determined by a conversion magnification, if the conversion magnification is final, the control data can be calculated in advance. Therefore, providing the third memory element 103 with data which are calculated in advance based on desired magnifications for reduction conversion and expansion magnification, it is possible to convert at various magnifications.

[Second Preferred Embodiment]

Figure 3:
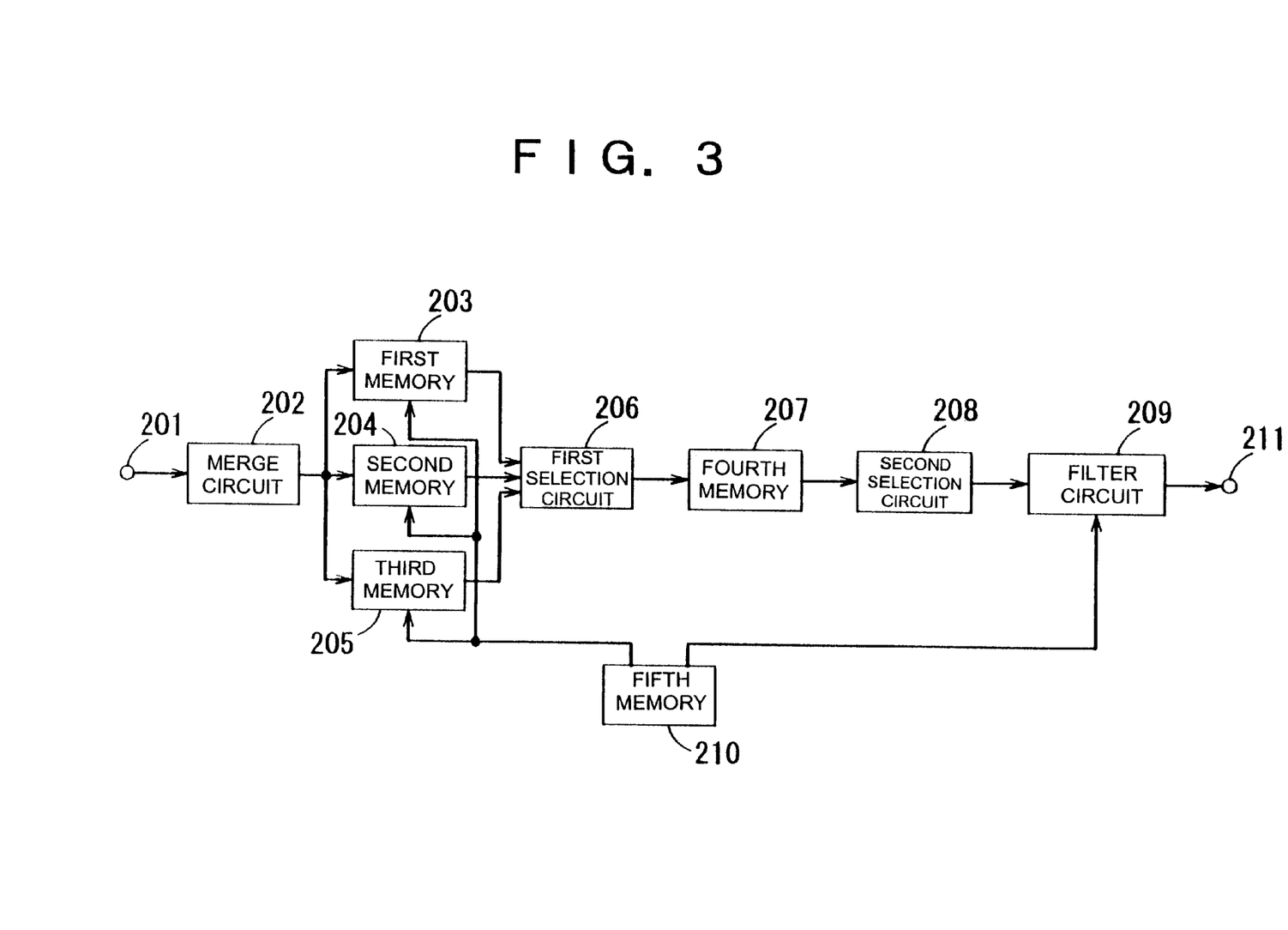
FIG. 3 is a block diagram of a structure of an image conversion apparatus according to a second preferred embodiment of the present invention.

FIG. 3 is a block diagram of a structure of an image conversion apparatus according to a second preferred embodiment of the present invention. In FIG. 3, input image signals are supplied to an input terminal 201. A filtering circuit 209 has a function as filtering means which generates output image signals from a plurality pieces of continuous pixel data. A merge circuit 202 has a function as merging means which merges and outputs the input image signals supplied to the input terminal 201 for every four pieces of continuous pixels. A first, a second and a third memory elements 203, 204 and 205 have functions as first, second and third memory means which store approximately one frame of outputs from the merge circuit 202. A first selection circuit 206 has a function as first selecting means which switches outputs from the first, the second and the third memory elements 203, 204 and 205 and outputs the same. A fourth memory element 207 has a function as fourth memory means which stores a larger quantity of continuous pixel data than pixel data which are required by the filtering circuit 209 from the outputs received from the first selection circuit 206 and outputs the pixel data. A second selection circuit 208 has a function as second selecting means which selects the pixel data which are required by the filtering circuit 209 from the output of the fourth memory element 207 and outputs the pixel data to the filtering circuit 209. A fifth memory element 210 has a function as fifth memory means which stores and outputs address data which are calculated in advance to control inputs and outputs of the first, the second and the third memory elements 203, 204 and 205 and control data which are calculated in advance to control a filter factor of the filtering circuit 209. At an output terminal 211, image conversion outputs from the filtering circuit 209 are available.

In the structure above, the first, the second and the third memory elements 203, 204 and 205 repeatedly write pixel data of different sequential frames of the input image signals, the first selection circuit 206 selects any one of the first, the second and the third memory elements 203, 204 and 205 which completed writing, the filtering circuit 209 receives outputs from the second selecting circuit 208, and in accordance with the address data in the fifth memory element 210, the first, the second and the third memory elements 203, 204 and 205 output a larger quantity of pixel data than the pixel data which are required by the filtering circuit 209.

Now, a description will be given on operations of an image conversion apparatus which performs conversion of a frame cycle of an image and image conversion for reduction down to 1/3 in the horizontal direction in the structure according to the second preferred embodiment as described above, with reference to FIGS. 2(a)–2(j) and 4(a)–4(d). However, the filtering circuit 209, the merge circuit 202, the first, the second, the third and the fourth memory elements 203, 204, 205 and 207 have the following structures, for the purpose of such image conversion. That is, the filtering circuit 209 is a 4-tap filtering circuit which generates output image signals using four pieces of continious pixel data. The filtering circuit 209 is similar to the filtering circuit 106 described in relation to the first preferred embodiment.

Meanwhile, the merge circuit 202 is a circuit which merges every four pieces of continuous pixel data with each other and outputs data. The merge circuit 202 is similar to the merge circuit 102 described in relation to the first preferred embodiment.

The first, the second and the third memory elements 203, 204 and 205 are frame memories which can be accessed at random.

Further, the fourth memory element is a register which stores and outputs eight pieces of pixel data.

Input image signals, as denoted in FIG. 2(a) as "INPUT IMAGE SIGNALS," are cyclically supplied one after another at the input terminal 201 to the merge circuit 202 (pixel data D11 to D34). The merge circuit 202, as denoted in FIG. 2(b) as "OUTPUTS FROM MERGE CIRCUIT," merges inputs thereto for every four pieces of continuous pixel data D11 to D14, D15 to D18, D19 to D22, D23 to D26, D27 to D30, and D31 to D34 and outputs signals (merge signals C1 to C6). In this case, when the input image signals received at the input terminal 201 are signals having a width of eight bits, the merge signals C1 to C6 outputted from the merge circuit 202 are signals having a width of 32 bits.

Approximately one frame of outputs from the merge circuit 202 are stored in either one of the first, the second and the third memory elements 203, 204 and 205, in accordance with an output from the fifth memory element 210.

At this stage, the outputs from the merge circuit 202 are stored at an address of either one of the three memory elements 203, 204 and 205 which increments 1 every time the merge circuit 202 executes the merge operation as denoted in FIG. 2(c) as "MEMORY ADDRESSES," for example.

For image conversion at a magnification of 1/3, as denoted in FIG. 2(e) as "CONTENTS OF SIGNALS REQUIRED FOR FILTERING," pixel data which are needed by the filtering circuit 209 are four pieces of pixel data which are continuous every three pixels. Further, the four pieces of pixel data, as denoted in FIG. 2(f) as "MEMORY ADDRESSES AT WHICH SIGNALS REQUIRED FOR FILTERING EXIST," are always stored at one memory address or two continuous memory addresses. In FIG. 2(d), ranges of signals required for filtering are shown in grouping symbols correlated to the pixel data of "INPUT IMAGE SIGNALS" in FIG. 2(a), for every pixel of "CONVERSION IMAGE SIGNALS."

Hence, the fifth memory element 210, as denoted in FIG. 2(g) as "MEMORY ADDRESSES OF SIGNALS TO OUTPUT," preliminarily calculates one of memory addresses containing the four pieces of continuous pixel data required by the filtering circuit 209, namely, the address bearing the larger figure in this example, for every pixel of "CONVERSION IMAGE SIGNALS" in FIG. 2(d) and stores the address.

In accordance with data of the address stored and outputted by the fifth memory element 210, either one of the first, the second and the third memory elements 203, 204 and 205 outputs stored data to the first selection circuit 206. In this case, the fifth memory element 210 outputs data at the timing which is the same as a distance between the pixels of "CONVERSION IMAGE SIGNALS" in FIG. 2(d). In short, the contents of the address changes for every piece of the pixel data of the image signals to be converted and outputted.

The first selection circuit 206 selects either one of the outputs outputted from the first, the second and the third memory elements 203, 204 and 205 in accordance with the address data which are outputted from the fifth memory element 210, and outputs signals containing pixel data required by the filtering circuit 209 to the fourth memory element 207.

The first selection circuit 206 described above is controlled in accordance with which one of a frame cycle of input signals and a frame cycle of conversion signals is larger than the other. In this example, not only selection by the first selection circuit 206 is controlled, but which one of the first, the second and the third memory elements 203, 204 and 205 receives outputs from the merge circuit 202 is controlled as well. Further, controlling in this example is variable in accordance with a frame cycle such that the two selection above differ each time.

Since the fourth memory element 207 is a circuit which stores and outputs pixel data which are twice larger than pixel data which are merged by the merge circuit 202, the fourth memory element 207 is capable of storing and outputting two signals merged by the merge circuit 202 which are outputs from the first selection circuit 206.

The two signals described here are output signals from either one of the first, the second and the third memory elements 203, 204 and 205 which are outputted in accordance with two different pieces of address data which are updated every time the address data in the first, the second and the third memory elements 203, 204 and 205 supplied from the fifth memory element 210 change, as denoted in FIG. 2(h) as "MEMORY ADDRESSES OF SIGNALS SUPPLIED TO SELECTION CIRCUIT." The structure and operations of the fourth memory element 207 are similar to those described in relation to the first preferred embodiment.

Hence, as denoted in FIG. 2(i) as "CONTENTS OF SIGNALS SUPPLIED TO SELECTION CIRCUIT," outputs from the forth memory element 207 include all of pixel data required by the filtering circuit 209 which are shown as "CONTENTS OF SIGNALS REQUIRED FOR FILTERING" in FIG. 2(e).

The second selecting circuit 208 selects the pixel data required by the filtering circuit 209 from the outputs from the forth memory element 207, and outputs the pixel data to the filtering circuit 209. The selection operations of the second selecting circuit 208 described above are the same as those of the selection circuit 105 described in relation to the first preferred embodiment.

Since the fifth memory element 210 calculates and stores in advance the control data which control the filter factor of the filtering circuit 209 for image conversion at a magnification of 1/3 as in the first preferred embodiment, the filtering circuit 209 generates image conversion signals from the output signals received from the second selection circuit 208 and outputs the image conversion signals at the output terminal 211, in accordance with the control data which are outputted from the fifth memory element 210. FIG. 2(j) shows that an input image (left-hand side) is reduced down to 1/3 in the horizontal direction and consequently becomes a converted image (righthand side).

Now, a description will be given on operations of the first, the second and the third memory elements 203, 204 and 205 in accordance with address data outputted from the fifth memory element 210, citing an example of converting a frame frequency of input image signals 5/4 times, with reference to FIGS. 4(a)–4(d).

Figure 4:
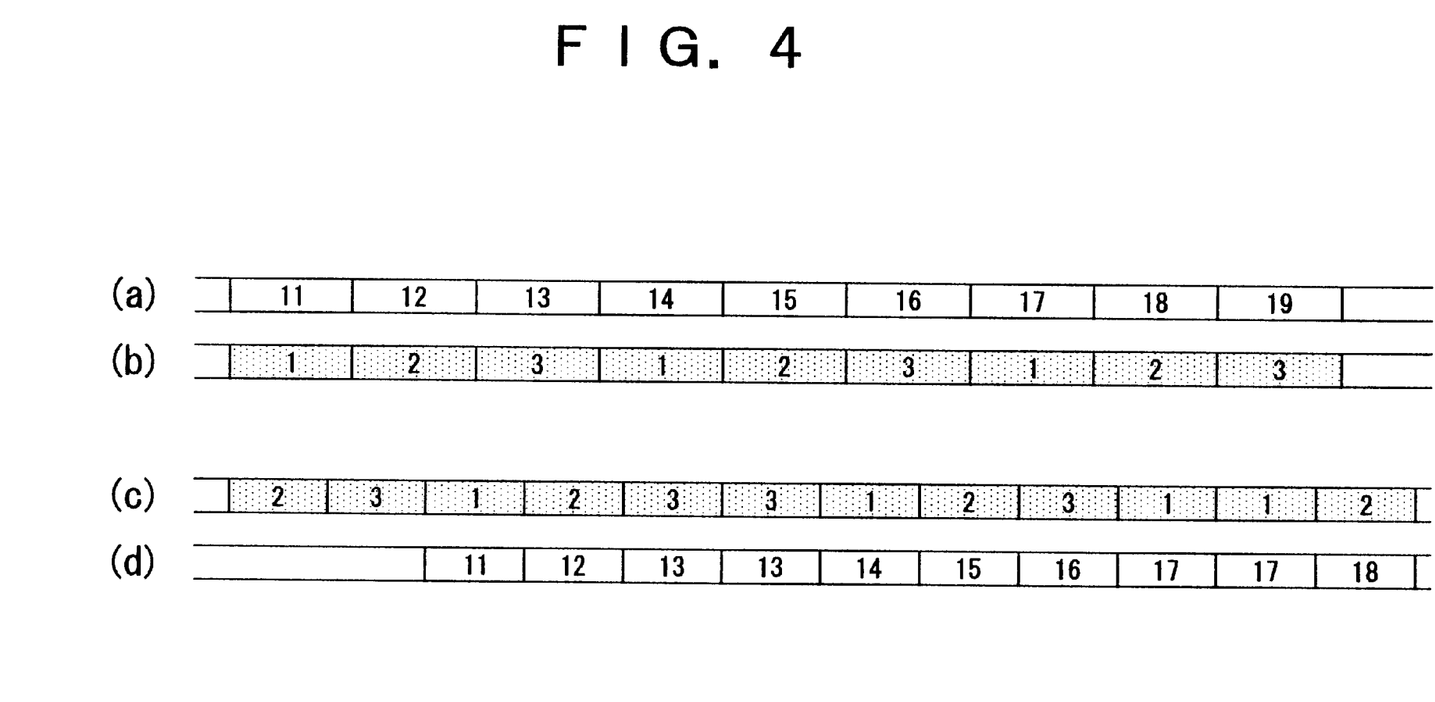

Input image signals, as denoted in FIG. 4(a) as "CONTENTS OF FRAME OF INPUT IMAGE SIGNALS," are supplied at the input terminal 201 to the merge circuit 202 in the order of frame numbers. First, in FIG. 4(b) showing "MEMORY TO SELECT FOR INPUTTING" and FIG. 4(c) showing "MEMORY TO SELECT FOR OUTPUTTING," the number "1" is assigned to the first memory element 203, the number "2" is assigned to the second memory element 204, and the number "3" is assigned to the third memory element.

Outputs from the merge circuit 202 are stored in either one of the three memory elements 203, 204 and 205 for every frame cycle of the input image signals, as denoted at the numbers shown as "MEMORY TO SELECT FOR INPUTTING" in FIG. 4(b). The fifth memory element 210 outputs address data which select a different memory element from the one storing the above among the three memory elements 203, 204 and 205 for every frame cycle of output image signals, as denoted at the numbers shown as "MEMORY TO SELECT FOR OUTPUTTING" in FIG. 4(c).

The first, the second or the third memory elements 203, 204 or 205 selected by the address data of the fifth memory element 210 outputs stored signals in accordance with the address data of the fifth memory element 210, as denoted in FIG. 2(d) as "CONTENTS OF FRAME OF OUTPUT IMAGE SIGNALS."

Through these operations, an image conversion method is realized in which approximately one frame of pixel data of input image signals are stored in either one of the first, the second and the third memory elements 203, 204 and 205, a larger quantity of continuous pixel data containing a plurality of continuous pixel data which are required for filtering are selectively read from either one of the first, the second and the third memory elements 203, 204 and 205 in advance and stored in the fourth memory element 207, the plurality of continuous pixel data which are required for filtering are selected from the fourth memory element 207, and output image signals are generated through filtering utilizing the plurality of selected continuous pixel data.

In addition, these operations allow frame cycle conversion for converting image signals as those denoted in FIG. 4(a) as "CONTENTS OF FRAME OF INPUT IMAGE SIGNALS" into image signals as those denoted in FIG. 2(d) as "CONTENTS OF FRAME OF OUTPUT IMAGE SIGNALS."

As described above, according to the second preferred embodiment of the present invention, outputs from the merge circuit 202 are stored in either one of the first, the second and the third memory elements 203, 204 and 205, outputs from either one of the first, the second and the third memory elements 203, 204 and 205 are stored in the fourth memory element 207 which is capable of storing two signals merged by the merge circuit 202, outputs from the fourth memory element 207 are selected by the second selection circuit 208, and the selected outputs are supplied to the filtering circuit 209 for image conversion. Hence, the first, the second and the third memory elements 203, 204 and 205 can output a plurality of continuous pixel data for one access, the first, the second and the third memory elements 203, 204 and 205 store pixel data of continuous three frames of continuous input image signals, a speed for writing pixel data to the first, the second and the third memory elements 203, 204 and 205 and a speed for reading pixel data from the first, the second and the third memory elements 203, 204 and 205 can be different from each other, and the fourth memory element 207 and the second selection circuit 208 can select necessary pixel data, and therefore, it is possible for the filtering circuit 209, which has a multi-tap structure and does not require high-speed accessing of the memory elements, to perform image conversion and frame cycle conversion. In this case, the more taps there are disposed, the better the conversion characteristic is.

Further, since use of the first, the second and the third memory elements 203, 204 and 205 allows that the memory element for storing outputs from the merge circuit 202 is different from the memory element for outputting to the first selection circuit 206, it is possible to eliminate conflict between storing and outputting within the same memory element, and hence, to simplify control of the memory elements.

Still further, as in the first preferred embodiment, since the fifth memory element 210 stores data which are calculated in advance based on desired magnifications for reduction conversion and expansion magnification, it is possible to convert at various magnifications.

[Third Preferred Embodiment]

Figure 5:
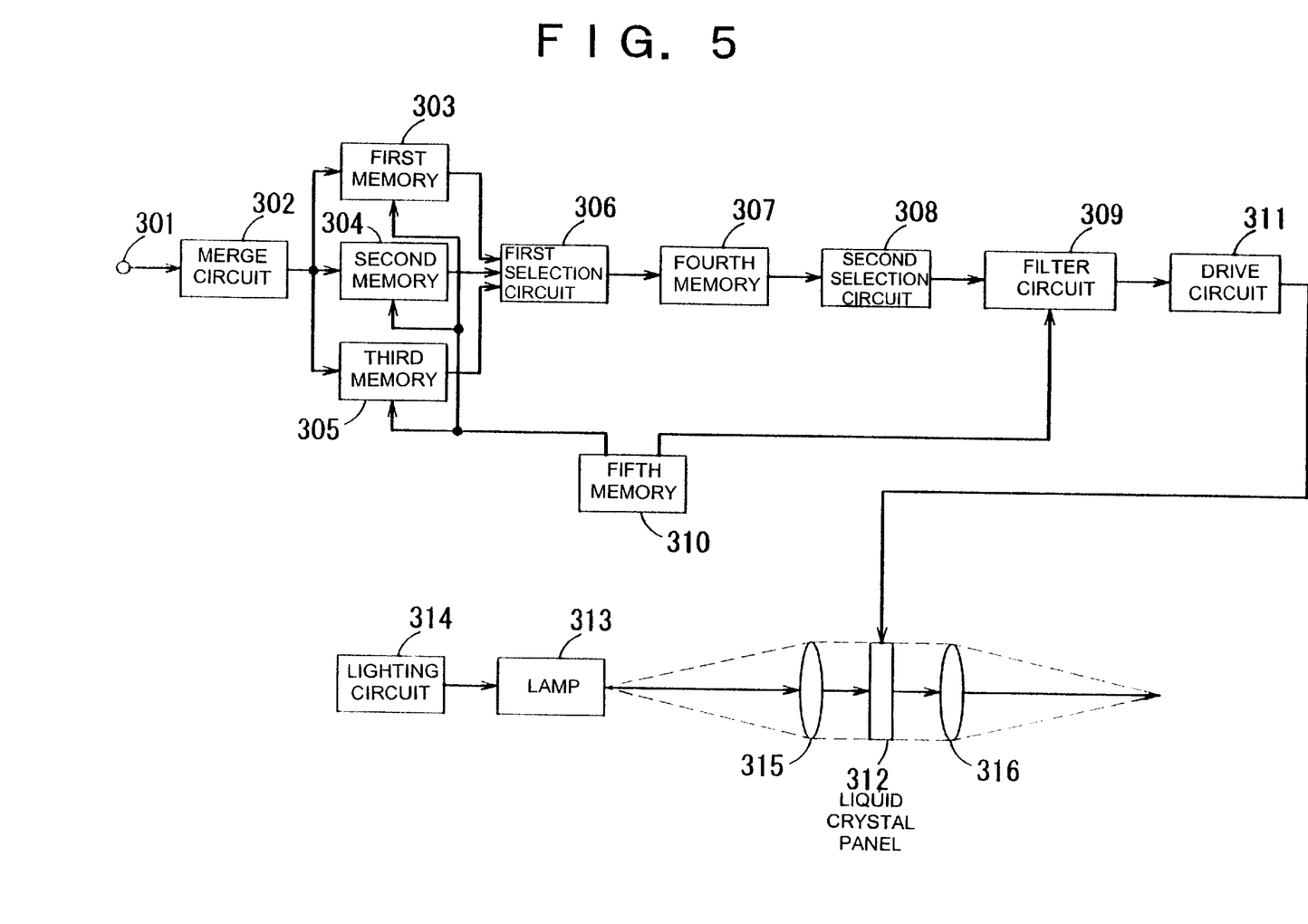
FIG. 5 is a block diagram of a structure of an image conversion apparatus according to a third preferred embodiment of the present invention.

FIG. 5 is a block diagram of a structure of a liquid crystal projector according to a third preferred embodiment of the present invention. In FIG. 5, input image signals are supplied to an input terminal 301. A filtering circuit 309 has a function as filtering means which generates output image signals from a plurality pieces of continuous pixel data. A merge circuit 302 has a function as merging means which merges and outputs the input image signals supplied to the input terminal 301 for every four pieces of continuous pixels. A first, a second and a third memory elements 303, 304 and 305 have functions as first, second and third memory means which store approximately one frame of outputs from the merge circuit 302. A first selection circuit 306 has a function as first selecting means which switches outputs from the first, the second and the third memory elements 303, 304 and 305 and outputs the same. A fourth memory element 307 has a function as fourth memory means which stores a larger quantity of continuous pixel data than pixel data which are required by the filtering circuit 309 from outputs from the first selection circuit 306 and outputs the pixel data. A second selection circuit 308 has a function as second selecting means which selects the pixel data which are required by the filtering circuit 309 from outputs of the fourth memory element 307 and outputs the pixel data to the filtering circuit 309. A fifth memory element 310 has a function as fifth memory means which stores and outputs address data which are calculated in advance to control inputs and outputs of the first, the second and the third memory elements 303, 304 and 305 and control data which are calculated in advance to control a filter factor of the filtering circuit 309. A drive circuit 311 has a function as driving means which allows a liquid crystal panel 312 to display image conversion outputs from the filtering circuit 309. A lamp 313 serves as a light source for displaying. A lighting circuit 304 has a function as lighting means which turns on the lamp 313. A converging lens 315 has a function as converging means which converges light which is emitted from the lamp 313. A projection lens 316 has a function as projecting means which projects light which was converged by the converging lens 315 and passed through the liquid crystal panel 312.

In the structure above, the first, the second and the third memory elements 303, 304 and 305 repeatedly write pixel data of different sequential frames of the input image signals, the first selection circuit 306 selects any one of the first, the second and the third memory elements 303, 304 and 305 which completed writing, the filtering circuit 309 receives outputs from the second selecting circuit 308, and in accordance with the address data in the fifth memory element 310, the first, the second and the third memory elements 303, 304 and 305 output a larger quantity of pixel data than the pixel data which are required by the filtering circuit 309.

In the structure above, the circuits prior to the filtering circuit 309 are the same as those in the image conversion apparatus shown in FIG. 3.

Now, a description will be given on operations of a liquid crystal projector which performs conversion of a frame cycle of an image and image conversion for reduction down to 1/3 in the horizontal direction in the structure according to the second preferred embodiment as described above, with reference to FIGS. 2(a)–2(j) and 4(a)–4(d). However, the filtering circuit 309, the merge circuit 302, the first, the second, the third and the fourth memory elements 303, 304, 305 and 307 have the following structures, for the purpose of such image conversion. That is, the filtering circuit 309 is a 4-tap filtering circuit which generates output image signals using four pieces of continues pixel data. The filtering circuit 309 is similar to the filtering circuits 106, 209 described in relation to the first and the second preferred embodiments.

Meanwhile, the merge circuit 302 is a circuit which merges every four pieces of continuous pixel data with each other and outputs data. The merge circuit 302 is similar to the merge circuits 102, 202 described in relation to the first and the second preferred embodiments.

The first, the second and the third memory elements 303, 304 and 305 are frame memories which can be accessed at random. Further, the fourth memory element 307 is a register which stores and outputs eight pieces of pixel data.

Input image signals, as denoted in FIG. 2(a) as "INPUT IMAGE SIGNALS," are cyclically supplied one after another to the merge circuit 302 at the input terminal 301 (pixel data D11 to D34). The merge circuit 302, as denoted in FIG. 2(b) as "OUTPUTS FROM MERGE CIRCUIT," merges inputs thereto for every four pieces of continuous pixel data D11 to D14, D15 to D18, D19 to D22, D23 to D26, D27 to D30, and D31 to D34 and outputs signals (merge signals C1 to C6). In this case, when the input image signals received at the input terminal 301 are signals having a width of eight bits, the merge signals C1 to C6 outputted from the merge circuit 302 are signals having a width of 32 bits.

Approximately one frame of outputs from the merge circuit 302 are stored in either one of the first, the second and the third memory elements 303, 304 and 305, in accordance with an output from the fifth memory element 310.

At this stage, the outputs from the merge circuit 302 are stored at an address of either one of the three memory elements 303, 304 and 305 which increments 1 every time the merge circuit 302 execute the merge operation as denoted in FIG. 2(c) as "MEMORY ADDRESSES," for example.

For image conversion at a magnification of 1/3, as denoted in FIG. 2(e) as "CONTENTS OF SIGNALS REQUIRED FOR FILTERING," pixel data which are needed by the filtering circuit 309 are four pieces of pixel data which are continuous every three pixels. Further, the four pieces of pixel data, as denoted in FIG. 2(f) as "MEMORY ADDRESSES AT WHICH SIGNALS REQUIRED FOR FILTERING EXIST," are stored always at one memory address or two continuous memory addresses. In FIG. 2(d), ranges of signals required for filtering are shown in grouping symbols correlated to the pixel data of "INPUT IMAGE SIGNALS" in FIG. 2(a), for every pixel of "CONVERSION IMAGE SIGNALS."

Hence, the fifth memory element 310, as denoted in FIG. 2(g) as "MEMORY ADDRESSES OF SIGNALS TO OUTPUT," preliminarily calculates one of memory addresses containing the four pieces of continuous pixel data required by the filtering circuit 309, namely, the address bearing the larger figure in this example, for every pixel of "CONVERSION IMAGE SIGNALS" in FIG. 2(d) and stores the address.

In accordance with data of address stored and outputted by the fifth memory element 310, either one of the first, the second and the third memory elements 303, 304 and 305 outputs stored data to the first selection circuit 306. In this case, the fifth memory element 310 outputs the data at the timing which is the same as a distance between the pixels of "CONVERSION IMAGE SIGNALS" in FIG. 2(d). In short, the contents of the address changes for every piece of the pixel data of the image signals to be converted and outputted.

The first selection circuit 306 selects either one of the outputs outputted from the first, the second and the third memory elements 303, 304 and 305 in accordance with the address data which are outputted from the fifth memory element 310, and outputs signals containing pixel data required by the filtering circuit 309 to the fourth memory element 307.

The first selection circuit 306 described above is controlled in accordance with which one of a frame cycle of input signals and a frame cycle of conversion signals is larger than the other. In this example, not only selection by the first selection circuit 306 is controlled, but which one of the first, the second and the third memory elements 303, 304 and 305 receives outputs from the merge circuit 302 is controlled as well. Further, controlling in this example is variable in accordance with a frame cycle such that the two selection above differ each time.

Since the fourth memory element 307 is a circuit which stores and outputs pixel data which are twice larger than pixel data which are merged by the merge circuit 302, the fourth memory element 307 is capable of storing and outputting two signals merged by the merge circuit 302 which are outputs from the first selection circuit 306.

The two signals described here are output signals from either one of the first, the second and the third memory elements 303, 304 and 305 which are outputted in accordance with two different pieces of address data which are updated every time the address data in the first, the second and the third memory elements 303, 304 and 305 supplied from the fifth memory element 310 change, as denoted in FIG. 2(h) as "MEMORY ADDRESSES OF SIGNALS SUPPLIED TO SELECTION CIRCUIT."

Hence, as denoted in FIG. 2(i) as "CONTENTS OF SIGNALS SUPPLIED TO SELECTION CIRCUIT," outputs from the forth memory element 307 include all of pixel data required by the filtering circuit 309 which are shown as "CONTENTS OF SIGNALS REQUIRED FOR FILTERING" in FIG. 2(e).

The second selecting circuit 308 selects the pixel data required by the filtering circuit 309 from the outputs from the forth memory element 307, and outputs the pixel data to the filtering circuit 309. The selection operations of the second selecting circuit 308 described above are the same as those of the selection circuit 105 described in relation to the first preferred embodiment.

Since the fifth memory element 310 calculates and stores in advance the control data which control the filter factor of the filtering circuit 309 for image conversion at a magnification of 1/3 as in the first preferred embodiment, the filtering circuit 309 generates image conversion signals from the output signals received from the second selection circuit 308 and outputs the image conversion signals to the drive circuit 311, in accordance with the control data which are outputted from the fifth memory element 310. FIG. 2(j) shows that an input image (left-hand side) is reduced down to 1/3 in the horizontal direction and consequently becomes a converted image (right-hand side).

The drive circuit 311, for the purpose of allowing the liquid crystal panel 312 to display image conversion signals supplied to the drive circuit 311, executes gamma processing, reverse processing for ac driving, etc., which optimize a contrast and outputs the signals to the liquid crystal panel 312. The liquid crystal panel 312 generates an optical image whose transmittance of light changes in accordance with inputs from the drive circuit 311.

The lamp 313 is turned on by the lighting circuit 314 and emits light. Light emitted from the lamp 313 is converged by the converging lens 315 and irradiated upon the liquid crystal panel 312.

The projection lens 316 projects light which was irradiated by the converging lens 315 and passed through the optical image generated by the liquid crystal panel 312.

Now, a description will be given on operations of the first, the second and the third memory elements 303, 304 and 305 in accordance with address data outputted from the fifth memory element 310, citing an example of converting a frame frequency of input image signals 5/4 times, with reference to FIGS. 4(a)–4(d).

Input image signals, as denoted in FIG. 4(a) as "CONTENTS OF FRAME OF INPUT IMAGE SIGNALS," are supplied to the merge circuit 302 in the order of frame numbers at the input terminal 301. First, in FIG. 4(b) showing "MEMORY TO SELECT FOR INPUTTING" and FIG. 4(c) showing "MEMORY TO SELECT FOR OUTPUTTING," the number "1" is assigned to the first memory element 303, the number "2" is assigned to the second memory element 304, and the number "3" is assigned to the third memory element.

Outputs from the merge circuit 302 are stored in either one of the three memory elements 303, 304 and 305 for every frame cycle of the input image signals, as denoted at the numbers shown as "MEMORY TO SELECT FOR INPUTTING" in FIG. 4(b). The fifth memory element 310 outputs address data which select a different memory element from the one storing the above among the three memory elements 303, 304 and 305 for every frame cycle of output image signals, as denoted at the numbers shown as "MEMORY TO SELECT FOR OUTPUTTING" in FIG. 4(c).

The first, the second or the third memory elements 303, 304 or 305 selected by the address data of the fifth memory element 310 outputs stored signals in accordance with the address data of the fifth memory element 310, as denoted in FIG. 2(d) as "CONTENTS OF FRAME OF OUTPUT IMAGE SIGNALS."

Through these operations, an image conversion method is realized in which approximately one frame of pixel data of input image signals are stored in either one of the first, the second and the third memory elements 303, 304 and 305, a larger quantity of continuous pixel data containing a plurality of continuous pixel data which are required for filtering are selectively read from either one of the first, the second and the third memory elements 303, 304 and 305 in advance and stored in the fourth memory element 307, the plurality of continuous pixel data which are required for filtering are selected from the fourth memory element 307, and output image signals are generated through filtering utilizing the plurality of selected continuous pixel data.

In addition, these operations allow frame cycle conversion for converting image signals as those denoted in FIG. 4(a) as "CONTENTS OF FRAME OF INPUT IMAGE SIGNALS" into image signals as those denoted in FIG. 2(d) as "CONTENTS OF FRAME OF OUTPUT IMAGE SIGNALS."

As described above, according to the third preferred embodiment of the present invention, outputs from the merge circuit 302 are stored in either one of the first, the second and the third memory elements 303, 304 and 305, outputs from either one of the first, the second and the third memory elements 303, 304 and 305 are stored in the fourth memory element 307 which is capable of storing two signals merged by the merge circuit 302, outputs from the fourth memory element 307 are selected by the second selection circuit 308, and the selected outputs are supplied to the filtering circuit 309 for image conversion. Hence, the first, the second and the third memory elements 303, 304 and 305 can output a plurality of continuous pixel data for one access, the first, the second and the third memory elements 303, 304 and 305 store pixel data of continuous three frames of continuous input image signals, a speed for writing pixel data to the first, the second and the third memory elements 303, 304 and 305 and a speed for reading pixel data from the first, the second and the third memory elements 303, 304 and 305 can be different from each other, and the fourth memory element 307 and the second selection circuit 308 can select necessary pixel data, and therefore, it is possible to realize a liquid crystal projector in which the filtering circuit 309, which has a multi-tap structure and does not require high-speed accessing of the memory elements, performs image conversion and frame cycle conversion.

Further, since use of the first, the second and the third memory elements 303, 304 and 305 allows that the memory element for storing outputs from the merge circuit 302 is different from the memory element for outputting to the first selection circuit 306, it is possible to eliminate conflict between storing and outputting within the same memory element, and hence, to simplify control of the memory elements.

Still further, as in the first preferred embodiment, since the fifth memory element 310 stores data which are calculated in advance based on desired magnifications for reduction conversion and expansion magnification, it is possible to convert at various magnifications.

When there is a trapezoidal distortion caused by tilted projection in which the projection lens is not parallel to a screen, data calculated while changing magnifications for reduction conversion and expansion magnification line by line of image signals may be stored in the fifth memory element 310, so that it is possible to realize correction of a trapezoidal distortion through reverse trapezoid processing.

What is claimed is:

1. An image conversion method in which output image signals are generated through filtering processing which uses a plurality pieces of continuous pixel data of input image signals which are sampled, wherein pixel data of approximately one frame of said input image signals are stored in first memory means, a larger quantity of continuous pixel data containing a plurality pieces of continuous pixel data needed for said filtering processing are read in advance from said first memory means and stored in second memory means, the plurality pieces of continuous pixel data needed for said filtering processing are selected from said second memory means, and said output image signals are generated through said filtering processing which uses the selected plurality pieces of pixel data.

2. The image conversion method of claim 1, wherein said first memory means is memory means which can be accessed at random.

3. An image conversion apparatus which generates output image signals through filtering processing which uses a plurality pieces of continuous pixel data of input image signals which are sampled, comprising:

filtering means which generates said output image signals from said plurality pieces of continuous pixel data;

merging means which receives said input image signals, and merges and outputs said input image signals for every plurality pieces of continuous pixel data;

first memory means which receives an output from said merging means and stores pixel data of approximately one frame;

second memory means which receives an output from said first memory means, and stores and outputs a larger quantity of continuous pixel data than a plurality pieces of continuous pixel data required by said filtering means;

selecting means which receives an output from said second memory means, and selects and outputs the plurality pieces of continuous pixel data required by said filtering means; and third memory means which stores and outputs address data which are calculated in advance to control an output from said first memory means and control data which are calculated in advance to control a filter factor of said filtering means, wherein said filtering means receives an output from said selecting means, and in accordance with the address data in said third memory means, said first memory outputs a larger quantity of pixel data than the pixel data which are required by said filtering means.

4. The image conversion apparatus of claim 3, wherein said first memory means is memory means which can be accessed at random.

5. The image conversion apparatus of claim 3, wherein said second memory means is memory means which is capable of storing pixel data whose quantity is larger than that of the continuous pixel data which are required by said filtering means and twice that of the pixel data which are merged by said merging means.

6. The image conversion apparatus of claim 3, wherein for the purpose of conversion to expand or reduce said input image signals, said third memory means stores the address data which are calculated in advance from a conversion magnification and control the output from said first memory means and the control data which are calculated in advance from the conversion magnification and control the filter factor of said filtering means.

7. The image conversion apparatus of claim 3, wherein for the purpose of conversion to correct a trapezoidal distortion of said input image signals, said third memory means stores the address data which are calculated in advance from a distortion factor and control an output from said first memory means and the control data which are calculated in advance from the distortion factor and control the filter factor of said filtering means.

8. An image conversion apparatus which generates output image signals through filtering processing which uses a plurality pieces of continuous pixel data of input image signals which are sampled, comprising:

filtering means which generates output image signals from said plurality pieces of continuous pixel data;

merging means which receives said input image signals, and merges and outputs said input image signals for every plurality pieces of continuous pixel data;

first, second and third memory means which receive an output from said merging means and store pixel data of approximately one frame;

first selecting means which receives outputs from said first, said second and said third memory means, and selects and outputs any one of the outputs from said first, said second and said third memory means;

fourth memory means which receives an output from said first selecting means, and stores and outputs a larger quantity of continuous pixel data than a plurality pieces of continuous pixel data required by said filtering means;

second selecting means which receives an output from said fourth memory means, and selects and outputs the plurality pieces of continuous pixel data required by said filtering means; and fifth memory means which stores and outputs address data which are calculated in advance to control the outputs from said first, said second and said third memory means and control data which are calculated in advance to control a filter factor of said filtering means, wherein said first, said second and said third memory means repeatedly write pixel data of different sequential frames of said input signals, said first selecting means selects any one of said first, said second and said third memory means which completed writing, said filtering means receives the output from said second selecting means, and in accordance with the address data in said fifth memory means, said first, said second and said third memory means output a larger quantity of pixel data than the pixel data which are required by said filtering means.

9. The image conversion apparatus of claim 8, wherein said first, said second and said third memory means are memory means which can be accessed at random.

10. The image conversion apparatus of claim 8, wherein said fourth memory means is memory means which is capable of storing pixel data whose quantity is larger than that of the continuous pixel data which are required by said filtering means and twice that of the pixel data which are merged by said merging means.

11. The image conversion apparatus of claim 8, wherein for the purpose of conversion to expand or reduce said input image signals, said fifth memory means stores the address data which are calculated in advance from a conversion magnification and control the outputs from said first, said second and said third memory means and the control data which are calculated in advance from the conversion magnification and control the filter factor of said filtering means.

12. The image conversion apparatus of claim 8, wherein for the purpose of conversion to correct a trapezoidal distortion of said input image signals, said fifth memory means stores the address data which are calculated in advance from a distortion factor and control the outputs from said first, said second and said third memory means and the control data which are calculated in advance from the distortion factor and control the filter factor of said filtering means.

* * * * *